Feb. 21, 1933. J. R. GAMMETER 1,898,623
PIPE COUPLING
Filed June 22, 1929 2 Sheets-Sheet 1
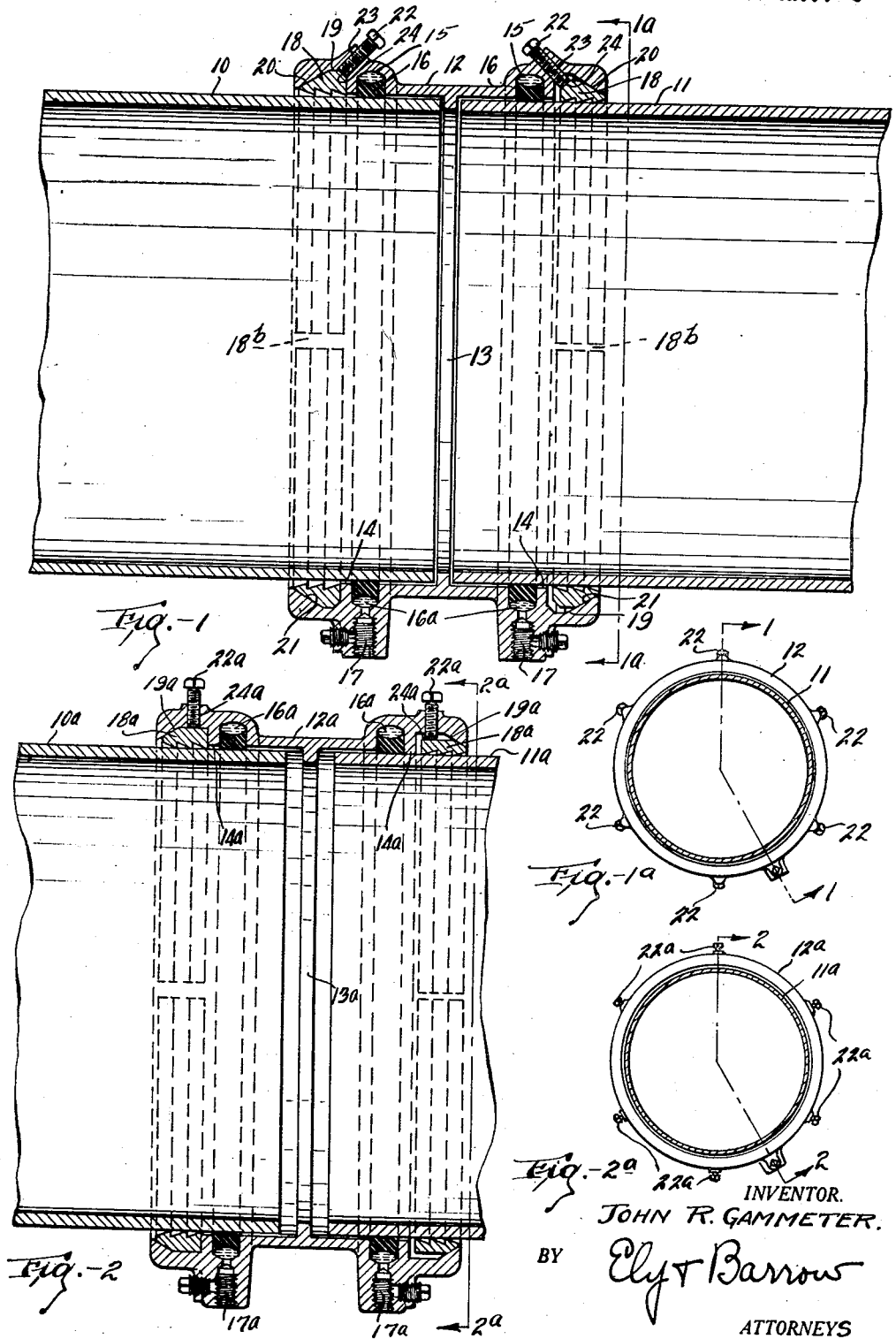

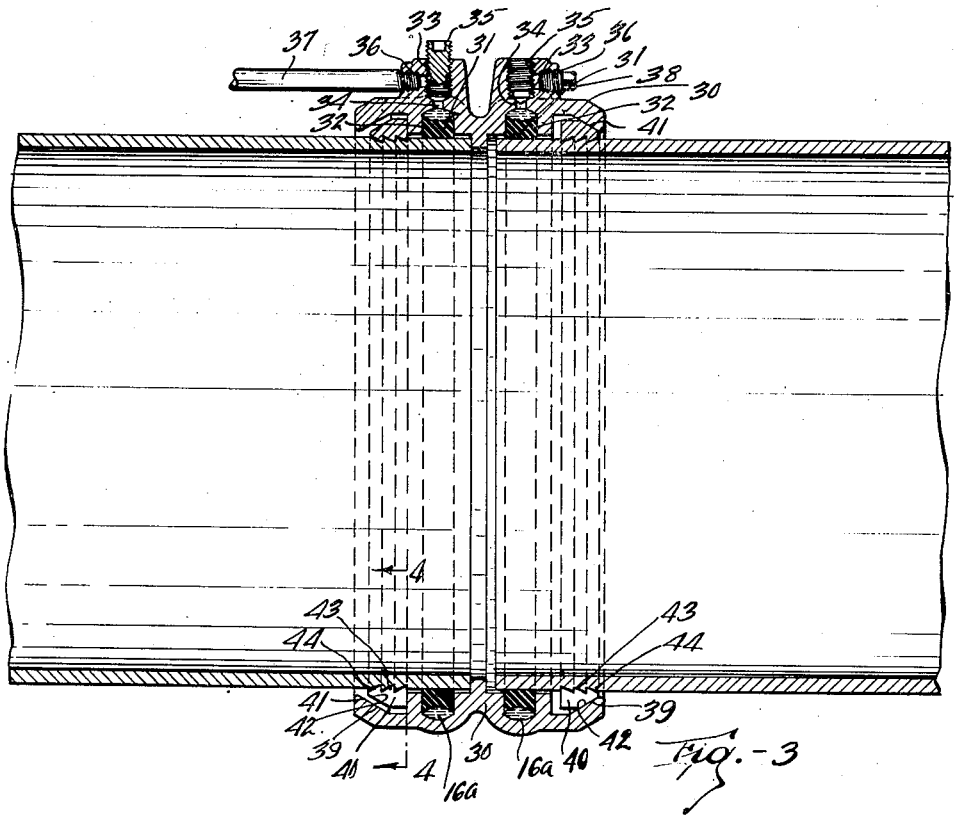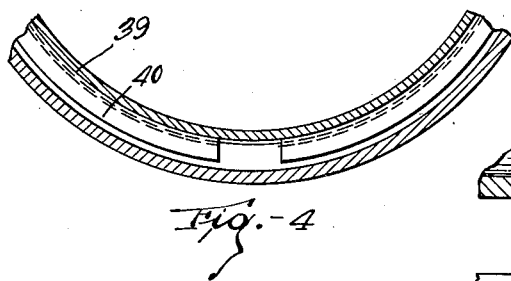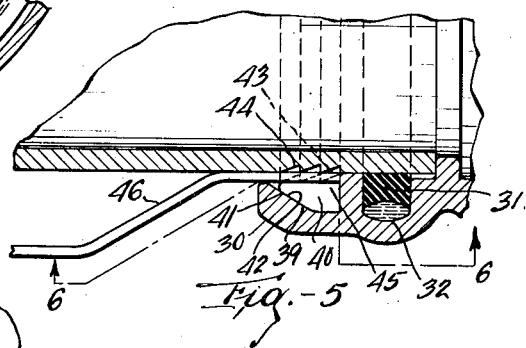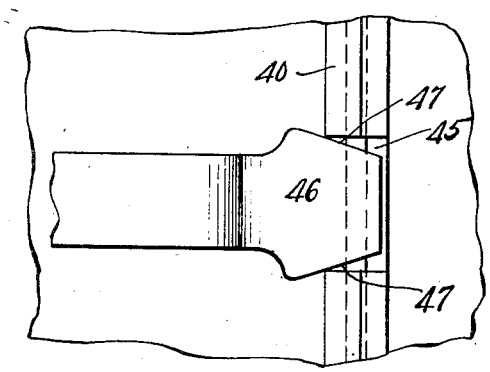

Patented Feb. 21, 1933

1,898,623

UNITED STATES PATENT OFFICE

JOHN R. GAMMETER, OF AKRON, OHIO

PIPE COUPLING

Application filed June 22, 1929. Serial No. 372,836.

This invention relates to pipe joints of couplings.

The general purpose of the invention is to provide in that type of pipe joint or coupling, including a pressure sealed gasket or the like, means effective in addition to the pressure gaskets for effectively holding the pipe ends in the joint and yet permitting the necessary expansion and contraction, whipping and misalignment of sections in the line and the follow-up action of such gaskets in maintaining the seal.

A further object is to provide means, as set forth above, which can readily be released to break a joint when desired.

The foregoing and other objects of the invention are attained in the pipe couplings or joints illustrated in the accompanying drawings and described below. It is to be understood that the invention is not limited to the specific forms.

Of the accompanying drawings,

Figure 1 is a diametral section on line 1—1 of Figure 1a enlarged through a pipe coupled in accordance with the invention, one side of the joint being shown secured and the other in readiness to be secured;

Figure 1a is a reduced section on line 1a—1a of Figure 1;

Figure 2 is a section on line 2—2 of Figure 2a;

Figure 2a is a reduced section on line 2a—2a of Figure 2;

Figure 3 is a diametral section through another pipe joint embodying the invention;

Figure 4 is a section on line 4—4 of Figure 3;

Figure 5 is an enlarged diametral section of the joint where the locking ring is open showing a tool therein to expand the same; and Figure 6 is a section on line 6—6 of Figure 5.

Referring to Figures 1 and 1a of the drawings, the numerals 10 and 11 designate adjacent pipe ends and the numeral 12 a coupling sleeve in which the invention may be embodied.

In the joint shown in Figure 1, the sleeve 12 is provided with an inner centering rib 13, against which the pipe ends 10 and 11 may abut, there being cylindrical guiding portions 14, 14 at each side of said rib on the inside of the sleeve 12 to guide the pipe ends when inserted in the coupling and when moving relative to the sleeve due to expansion and contraction in the line. The sleeve is provided with internal channels 15, 15 adjacent each end thereof, in which are pressure gaskets 16, 16, preferably of suitable tough resilient material such as rubber of a known compound which is not subject to "cold flow". These gaskets may be arranged to be urged under pressure against the pipe ends 10 and 11 by means of a resilient permanently plastic or fluid pressure medium forced therein through check valves 17, 17 initially to seal the joint against pressure within or atmospheric pressure outside the pipe and in case the former, the gaskets are so formed and arranged as to trap fluid under pressure in the line, leaking past the gasket, in the channel whereby the pressure on the gasket is never less than line pressure.

The pressure gaskets described above permit expansion, contraction and whipping of the line without breaking the seal, but for certain installations, an additional means to prevent pulling of the joint apart has been found to be desirable. Such means may consist of expansible rings 18, 18 which may be transversely slit as at 18b and housed in channels 19, 19 in the ends of the sleeve 12, the inner peripheries thereof preferably being roughened as shown to grip onto the pipe ends. The inner surfaces of the channels 19, 19 are tapered toward the ends of the sleeve as indicated at 20 and the outer peripheries of the rings 18 are correspondingly tapered as at 21 so that when urged axially of the sleeve toward the ends of the coupling sleeve, the pipe ends 10 or 11 will be tightly gripped due to contraction of the rings 18 thereon by the wedging action between the sleeve and pipe ends. To contract the rings 18 into gripping relation to the pipe ends to secure the joint, pressure screws 22, 22 are provided, these being arranged to apply pressure inwardly and toward the ends of the coupling sleeve, the screws being threaded through bores 23, 23 fixed in the sleeve and the rings 18 are provided with peripheral surfaces at 24 substantially perpendicular to the screws to be engaged by the inner ends of the screws.

As shown in Figure 1 of the drawings, the left ring is in its normal expanded condition, the pipe end 10 has been inserted and the pressure medium has been forced into the channel 15 as indicated at 16ª. The final operation for securing the joint is to contract ring 18 by the screws 22 into engagement with the pipe end as shown at the right in Figure 1, so that the pipe end will be gripped by the ring. It will appear that any tendency for the pipe ends to pull out of the joint will cause the rings 18 gripped thereon to be forced into tighter and tighter gripping relation to the pipe ends by reason of the wedging action of surfaces 20 and 21.

In Figures 2 and 2ª, a similar coupling is shown, the corresponding parts of which are represented by corresponding numerals with the exponent a. This coupling is similar excepting that somewhat greater freedom for contraction and expansion is allowed by provision of radially directed screws 22ª, 22ª cooperating with cylindrical outer peripheral surfaces 24ª, 24ª on rings 18ª, 18ª, the frictional resistance of the ends of the screws being all that offers resistance to expansion and contraction until the pipe end moves so far out of the sleeve as to force the rings 18ª into wedging relation in the channels 19ª.

It will appear from the foregoing that when it is desired to break the joint, the screws 22 or 22ª of either of the above forms of the invention can be released, permitting the rings 18 or 18ª to expand in their channels 19 or 19ª and allowing the pipe ends to be removed from the sleeve.

In Figures 3 to 6 there is shown another form of the invention in which the pipe joint includes a member, such as a sleeve 30 spanning the joint, and having one or more pressure gaskets 31 therein in one or more channels 32 to which a pressure medium may be supplied about the gaskets as by fittings thereon at 33 including an inlet port 34 arranged to be closed by a plug valve 35 seating thereon, said fitting having a side inlet 36 to which a connection such as 37 may be made to force the pressure medium into the channels when the plug valve 35 is open as shown at the left of Figure 3. The side inlet 35 may be closed after connection 37 is removed as by a plug 38 as shown at the right of Figure 3, the plug valve 35 being closed of course to hold the pressure in the channel before the connection 37 is removed.

The member 33 is formed with one or more locking ring channels 39 in which are housed transversely split contractile rings 40, these rings being adapted to be expanded by insertion of the pipe and normally to grip the pipe by their contraction thereon. The channels 39 have their walls adjacent the ends of member 30 tapered inwardly as at 41 and the outer surfaces of rings 40 are correspondingly tapered at 42 so that any tendency for the pipe ends to move out of the joint causes further contraction of rings 40 onto the pipe by wedging action between surfaces 41 and 42. In this form of the invention the inner surfaces 43 of rings 40 are preferably serrated and the outer surfaces of the pipes adjacent their ends are preferably correspondingly grooved as at 44 to resist relative movement of the rings and pipe ends in a direction outwardly of the joint to insure that the ring will coact with the tapered wall 41 and tightly grip the pipe to prevent complete withdrawal of the pipe end from the coupling.

The space at 45 between the split ends of the rings 40 is preferably sufficiently large to permit insertion of a suitable tool therebetween to expand rings 40 out of engagement with the pipe when it is desired to break a joint. Such a tool is shown at 46 and is formed with diverging wedge surfaces 47, 47 adapted to engage the ends of the rings and force them apart to expand the rings by insertion of the tool into the joint into the space at 45.

It is to be understood that the invention is not limited to separate sleeve coupled joints as shown and can be embodied in any of the several types of couplings used. It will be obvious that modifications of the invention other than those specified herein may be resorted to without departing from the spirit thereof or the scope of the appended claims.

What is claimed is:

1. A pipe joint comprising a coupling member, a pressure actuated gasket housed therein, and means for retaining a pipe end in said coupling comprising a transversely split contractile ring housed so as to be shiftable in an annular channel in the coupling member and embracing the pipe end, means on the coupling member cooperating with said split ring whereby any tendency for movement of the pipe end out of the coupling member will cause said element to be wedged tightly between the coupling member and the pipe end to resist such movement, and adjustable means for contracting said ring.

2. A pipe joint comprising a coupling member, a pressure actuated gasket housed therein, and means for retaining a pipe end in said coupling comprising a transversely split contractile ring housed so as to be shiftable in the coupling member and embracing the pipe end, and means on the coupling member cooperating with said ring whereby any tendency for movement of the pipe end out of the coupling member will cause said ring to be wedged and contracted tightly between the coupling member and the pipe end to resist such movement, said ring being positively releasable from wedging relation between the coupling member and pipe end by insertion of a tool between the ends of the ring at the split to permit breaking of the joint.

3. A pipe joint comprising a coupling member secured to one pipe end and embracing another pipe end having annular grooves thereon, said member having an inner channel, a gasket contractible in the channel by fluid pressure in the channel about the gasket, said member having another inner channel with an outer wall tapering toward the end of said member, a contractible ring in the second inner channel having serrated ribs for cooperating with the grooves on said other pipe end whereby said ring is movable with said other pipe end axially in wedging relation with said tapered wall upon movement of said other pipe end outwardly of the coupling members, said ring being positively releasable from the pipe end to permit breaking of the joint.

4. A pipe joint comprising a coupling member secured to one pipe end and embracing another pipe end, said member having an inner channel, a gasket contractible in the channel by fluid pressure in the channel about the gasket, said member having another inner channel with an outer wall tapering toward the end of said member, a transversely split contractile ring in said other inner channel adapted initially to grip said other pipe end to move therewith axially in wedging relation with said tapered wall upon movement of said other pipe end outwardly of the coupling member and to be contracted by said tapered wall, said ring being adapted to be spread from the outside of the coupling by a tool engaged between the ends thereof to disengage the ring from gripping relation with said other pipe end.

5. A pipe joint including a coupling member, a pressure sealed gasket housed in said coupling member, means for retaining a pipe end in said coupling member including a transversely split contractile ring housed in a channel in the coupling member and adapted to be secured to the pipe end after insertion of the pipe end in the coupling members, the housing for said element having a tapered wall, said ring adapted to be contracted into engagement with said pipe and to be shiftable by movement of the pipe end in the coupling member so as to engage with said tapered wall of its housing therein further to contract said element against said pipe end to prevent separation of the pipe end from the coupling member, and means operatively associated with said ring for urging said element into wedging relation with said tapered wall independently of movement of the pipe end.

JOHN R. GAMMETER.